(12) United States Patent
Michl et al.

(10) Patent No.: US 8,980,998 B2
(45) Date of Patent: Mar. 17, 2015

(54) AQUEOUS BINDERS FOR GRANULAR AND/OR FIBROUS SUBSTRATES

(75) Inventors: Kathrin Michl, Ludwigshafen (DE); Markus Braun, Heidelberg, DE (US); Evgueni Klimov, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 164 days.

(21) Appl. No.: 13/424,887

(22) Filed: Mar. 20, 2012

(65) Prior Publication Data

US 2012/0245277 A1    Sep. 27, 2012

Related U.S. Application Data

(60) Provisional application No. 61/466,513, filed on Mar. 23, 2011.

(51) Int. Cl.
*C09D 135/00* (2006.01)
*C08L 33/02* (2006.01)
*C08K 5/053* (2006.01)

(52) U.S. Cl.
CPC ................................. *C09D 135/00* (2013.01)
USPC ............... 524/556; 524/386; 524/86; 524/99; 524/106; 524/186

(58) Field of Classification Search
CPC ............ C08L 33/02; C08K 5/34; C08K 5/17; C08K 5/053
USPC ...................... 524/86, 99, 106, 186, 386, 556
See application file for complete search history.

(56) References Cited

U.S. PATENT DOCUMENTS

| 4,076,917 | A | 2/1978 | Swift et al. |
| 5,143,582 | A | 9/1992 | Arkens et al. |
| 2004/0082689 | A1 | 4/2004 | Taylor et al. |
| 2009/0181251 | A1* | 7/2009 | Shooshtari et al. ........... 428/375 |

FOREIGN PATENT DOCUMENTS

| AU | 200113868 A | * 6/2001 | ............... C08K 5/15 |
| DE | 2 214 450 | 10/1972 | |
| DE | 40 03 422 A1 | 8/1991 | |
| EP | 0 445 578 A2 | 9/1991 | |
| EP | 0 583 086 A1 | 2/1994 | |
| EP | 0 651 088 A1 | 5/1995 | |
| EP | 0 672 920 A1 | 9/1995 | |
| WO | WO 97/45461 | 12/1997 | |
| WO | WO 99/09100 | 2/1999 | |
| WO | WO 2010/034645 A1 | 4/2010 | |

* cited by examiner

*Primary Examiner* — Vu A Nguyen
(74) *Attorney, Agent, or Firm* — Oblon, McClelland, Maier & Neustadt, L.L.P.

(57) ABSTRACT

Aqueous binder for granular and/or fibrous substrates based on polyacids, polyols and basic nitrogen compounds.

20 Claims, No Drawings

AQUEOUS BINDERS FOR GRANULAR AND/OR FIBROUS SUBSTRATES

The present invention relates to aqueous binders for granular and/or fibrous substrates, comprising as active constituents
a) at least one polymer obtainable by free-radical polymerization and comprising

| | |
|---|---|
| ≥5 and ≤100 wt % | of at least one α,β-monoethylenically unsaturated mono- or dicarboxylic acid and/or anhydride (monomer A1), and |
| ≥0 and ≤95 wt % | of at least one other ethylenically unsaturated compound which is copolymerizable with the monomers A1 (monomer A2), | in polymerized form, wherein the monomer amounts A1 and A2 sum to 100 wt % [polymer A],
b) at least one nitrogen-free polyol compound having at least two hydroxyl groups [polyol B], and
c) at least one hydroxyl-free organic nitrogen compound having at least one $pK_B$ value ≤7 (measured at 25° C. in deionized water) and/or at least one hydroxyl-free imidazole compound [nitrogen base C].

The present invention likewise relates to processes for producing shaped articles by using fibrous and/or granular substrates using the aforementioned aqueous binder, and also to the shaped articles themselves.

The consolidation of fibrous or granular substrates, more particularly in sheetlike structures, exemplified by fiber webs, fiberboards or chipboard panels, etc., is frequently accomplished chemically using a polymeric binder. To increase the strength, particularly the wet strength and thermal stability, in many cases binders are used which comprise crosslinkers that give off formaldehyde. As a consequence of this, however, there is a risk of unwanted formaldehyde emission.

For the purpose of avoiding formaldehyde emissions there have already been numerous alternatives proposed to the binders known to date. For instance U.S. Pat. No. 4,076,917 discloses binders which comprise carboxylic acid-containing or carboxylic anhydride-containing polymers and β-hydroxyalkylamides as crosslinkers. A disadvantage is the relatively costly and inconvenient preparation of the β-hydroxyalkylamides.

EP-A 445578 discloses boards made of finely divided materials, such as glass fibers, for example, in which mixtures of high molecular weight polycarboxylic acids and polyhydric alcohols, alkanolamines or polyfunctional amines act as binders.

EP-A 583086 discloses formaldehyde-free aqueous binders for producing fiber webs, more particularly glass fiber webs. The binders comprise a polycarboxylic acid having at least two carboxylic acid groups and also, optionally, anhydride groups, and a polyol. These binders require a phosphorus-containing accelerator in order to attain sufficient strengths on the part of the glass fiber webs. It is noted that the presence of such an accelerator is vital unless a reactive polyol is used. Highly reactive polyols specified include β-hydroxyalkylamides.

EP-A 651088 describes corresponding binders for substrates made from cellulosic fiber. These binders mandatorily comprise a phosphorus-containing reaction accelerant.

EP-A 672920 describes formaldehyde-free binding, impregnating or coating compositions which comprise at least one polyol and a polymer which is composed to an extent of 2% to 100% by weight of an ethylenically unsaturated acid or acid anhydride comonomer. The polyols are substituted triazine, triazinetrione, benzene or cyclohexyl derivatives, and the polyol radicals are always located in positions 1, 3, and 5 of the aforementioned rings. In spite of a high drying temperature, the wet tensile strengths obtained with these binders on glass fiber webs are low.

DE-A 2214450 describes a copolymer composed of 80% to 99% by weight of ethylene and 1% to 20% by weight of maleic anhydride. Together with a crosslinking agent, the copolymer is used in powder form or in dispersion in an aqueous medium for the purpose of surface coating. The crosslinking agent used is a polyalcohol which contains amino groups. In order to bring about crosslinking, however, heating must be carried out at up to 300° C.

U.S. Pat. No. 5,143,582 discloses the production of heat-resistant nonwoven-web materials using a thermosetting heat-resistant binder. The binder is formaldehyde-free and is obtained by mixing a crosslinker with a polymer containing carboxylic acid groups, carboxylic anhydride groups or carboxylic salt groups. The crosslinker is a β-hydroxyalkylamide or a polymer or copolymer thereof. The polymer crosslinkable with the β-hydroxyalkylamide is synthesized, for example, from unsaturated monocarboxylic or dicarboxylic acids, salts of unsaturated monocarboxylic or dicarboxylic acids, or unsaturated anhydrides. Self-curing polymers are obtained by copolymerizing the β-hydroxyalkylamides with monomers comprising carboxyl groups.

US-A 2004/82689 discloses formaldehyde-free aqueous binders for producing fiber webs, more particularly glass fiber webs, said binders consisting essentially of a polymeric polycarboxylic acid, a polyol and an imidazoline derivative. The bonded fiber webs obtained are said to exhibit reduced water absorption. Both nitrogen-containing and nitrogen-free polyols are disclosed nonspecifically, although the nitrogen-containing triethanolamine in particular is described as preferred. Specific imidazoline derivatives mentioned include reaction products of a fatty acid with aminoethylethanolamine or diethylenetriamine. The aqueous binder compositions disclosed contain a phosphorus-containing accelerator.

WO 99/09100 discloses thermally curable compositions comprising, in addition to an alkanolamine having at least two OH groups, a polymer 1 and a further polymer 2 comprising respectively ≤5 wt % and ≥15 wt % of an α,β-ethylenically unsaturated mono- or dicarboxylic acid in polymerized form, and the use of said compositions as formaldehyde-free binders in the manufacture of shaped articles.

Furthermore WO10/34645 discloses aqueous binder systems for granular and/or fibrous substrates, comprising as active constituents a polymer 1, comprising ≥5.5 wt % and ≤20 wt % of an α,β-ethylenically unsaturated mono- or dicarboxylic acid in polymerized form, a polymer 2, comprising ≥40 wt % of an α,β-ethylenically unsaturated mono- or dicarboxylic acid in polymerized form, and a polyol compound having at least two hydroxyl groups.

A priority-founding European patent application numbered 11154347.6, unpublished at the filing date of the present invention, discloses, for granular and/or fibrous substrates, aqueous binders which, in addition to a carboxyl-containing addition polymer and a polyol compound, comprise essentially a salt compound. These salt-containing binder liquors have an advantageous effect on wet breaking strength and also 180° C. breaking strength of fiber webs bonded therewith.

Yet the shaped articles, more particularly fiber webs, obtained with the aforementioned compositions are not always fully satisfactory in all mechanical properties, more particularly wet breaking strength and also yellowing.

It is an object of the present invention to provide an alternative formaldehyde-free binder system for fibrous and/or granular substrates which results in improved mechanical and/or visual properties for fiber webs, more particularly wet breaking strength and/or yellowing.

We have found that this object is achieved by the aqueous binder defined at the beginning.

Polymer A comprises ≥5 wt % and ≤100 wt %, preferably ≥70 wt % and ≤100 wt % and more preferably ≥85 wt % and ≤100 wt % of at least one α,β-monoethylenically unsaturated mono- or dicarboxylic acid and/or anhydride (monomers A1) and correspondingly ≥0 wt % and ≤95 wt %, preferably ≥0 wt % and ≤30 wt % and more preferably ≥0 wt % and ≤15 wt % of at least one further monomer, other than the α,β-monoethylenically unsaturated mono- or dicarboxylic acids and/or anhydride (monomers A2) in polymerized form. The monomers A1 and the monomers A2 sum to 100 wt %. It is particularly advantageous, however, for polymer A to be constructed exclusively of monomers A1.

The monomers A1 comprise α,β-monoethylenically unsaturated, more particularly $C_3$ to $C_6$, preferably $C_3$ or $C_4$, mono- or dicarboxylic acids and also their fully or partially neutralized water-soluble salts, more particularly their alkali metal or ammonium salts, for example acrylic acid, methacrylic acid, ethylacrylic acid, itaconic acid, allylacetic acid, crotonic acid, vinylacetic acid, fumaric acid, maleic acid, 2-methylmaleic acid, but also monoesters of ethylenically unsaturated dicarboxylic acids, such as monoalkyl esters of maleic acid with $C_1$ to $C_8$ alcohols, and also the ammonium, sodium or potassium salts of the aforementioned acids. But the monomers A1 also comprise the anhydrides of corresponding α,β-monoethylenically unsaturated dicarboxylic acids, for example maleic anhydride or 2-methylmaleic anhydride. Preferably, monomer A1 is selected from the group comprising acrylic acid, methacrylic acid, crotonic acid, fumaric acid, maleic acid, maleic anhydride, 2-methylmaleic acid and itaconic acid, of which acrylic acid, methacrylic acid, maleic acid, maleic anhydride and/or itaconic acid are particularly preferred.

Useful monomers A2 include all ethylenically unsaturated monomers that differ from the monomers A1 and are copolymerizable therewith. Useful monomers A2 include, for example, vinylaromatic compounds, such as styrene, α-methylstyrene, o-chlorostyrene or vinyltoluenes, vinyl halides, such as vinyl chloride or vinylidene chloride, esters of vinyl alcohol and $C_1$ to $C_{18}$ and preferably $C_2$ to $C_{12}$ monocarboxylic acids, such as vinyl acetate, vinyl propionate, vinyl n-butyrate, vinyl laurate and vinyl stearate, $C_1$ to $C_{12}$ alkyl vinyl ethers, such as methyl vinyl ether, ethyl vinyl ether, n-propyl vinyl ether, n-butyl vinyl ether, n-pentyl vinyl ether, n-hexyl vinyl ether, esters of preferably $C_3$ to $C_6$ α,β-monoethylenically unsaturated mono- and dicarboxylic acids, more particularly acrylic acid, methacrylic acid, maleic acid, fumaric acid and itaconic acid with generally $C_1$ to $C_{12}$, preferably $C_1$ to $C_8$ and more particularly $C_1$ to $C_4$ alkanols, particularly methyl acrylate, ethyl acrylate, n-butyl acrylate, isobutyl acrylate, pentyl acrylate, hexyl acrylate, heptyl acrylate, octyl acrylate, nonyl acrylate, decyl acrylate, 2-ethylhexyl acrylate, methyl methacrylate, ethyl methacrylate, n-butyl methacrylate, isobutyl methacrylate, pentyl methacrylate, hexyl methacrylate, heptyl methacrylate, octyl methacrylate, nonyl methacrylate, decyl methacrylate, 2-ethylhexyl methacrylate, dimethyl fumarate, di-n-butyl fumarate, dimethyl maleate, di-n-butyl maleate, nitriles of α,β-monoethylenically unsaturated carboxylic acids, such as acrylonitrile, methacrylonitrile, fumaronitrile, maleonitrile and also $C_{4-8}$ conjugated dienes, such as 1,3-butadiene (butadiene) and isoprene. The aforementioned monomers are generally ≥50% by weight, preferably ≥80% by weight and more preferably ≥90% by weight of the total amount of all monomers A2 and thus constitute the main monomers A2. It is preferable according to the present invention for polymer A to comprise as main monomer A2 an ester of acrylic acid or methacrylic acid with a $C_1$ to $C_{12}$ alcohol, especially methyl acrylate, ethyl acrylate, n-butyl acrylate, 2-ethylhexyl acrylate or methyl methacrylate, a vinylaromatic compound, especially styrene, a nitrile of an α,β-monoethylenically unsaturated carboxylic acid, especially acrylonitrile and/or a vinyl ester of a $C_2$ to $C_{12}$ monocarboxylic acid in polymerized form.

Useful monomers A2 further include a minor proportion of such ethylenically unsaturated monomers that comprise either at least one sulfonic acid group and/or its corresponding anion, or at least one amino, amido, ureido or N-heterocyclic group and/or the ammonium derivatives thereof that are alkylated or protonated at the nitrogen. Examples are acrylamide and meth-acrylamide, moreover vinylsulfonic acid, 2-acrylamido-2-methylpropanesulfonic acid, styrenesulfonic acid and their water-soluble salts and also N-vinylpyrrolidone, 2-vinylpyridine, 4-vinyl-pyridine, 2-vinylimidazole, 2-(N,N-dimethylamino)ethyl acrylate, 2-(N,N-dimethylamino)ethyl methacrylate, 2-(N,N-diethylamino) ethyl acrylate, 2-(N,N-diethylamino)ethyl methacrylate, 2-(N-tert-butylamino)ethyl methacrylate, N-(3-N',N'-dimethylaminopropyl)methacrylamide and 2-(1-imidazolin-2-onyl)ethyl methacrylate. The aforementioned monomers A2 are generally used in amounts ≤10% by weight, preferably ≤8% by weight and more preferably ≤5% by weight, all based on the total amount of monomers A2. The monomer used is preferably acrylamide and/or methacrylamide in an amount of ≥0.5 and ≤4% by weight, based on the total amount of monomers A2.

Monomers A2 which typically enhance the integrity of films formed by a polymer matrix normally comprise at least one epoxy group, at least one carbonyl group or at least two nonconjugated ethylenically unsaturated double bonds. Examples thereof are monomers comprising two vinyl radicals, monomers comprising two vinylidene radicals and also monomers comprising two alkenyl radicals. Of particular advantage here are the diesters of dihydric alcohols with α,β-monoethylenically unsaturated monocarboxylic acids, among which acrylic acid and methacrylic acid are preferred. Examples of such monomers comprising two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate and also divinylbenzene, vinyl methacrylate, vinyl acrylate, allyl methacrylate, allyl acrylate, diallyl maleate, diallyl fumarate, methylenebis-acrylamide, cyclopentadienyl acrylate, triallyl cyanurate or triallyl isocyanurate. The aforementioned monomers A2 are generally used in amounts ≤10% by weight, preferably ≤5% by weight and more preferably ≤2% by weight, all based on the total amount of monomers A2.

When a monomer A2 is used for producing the polymer A, it is advantageously selected from the group comprising methyl acrylate, ethyl acrylate, n-butyl acrylate, 2-ethylhexyl acrylate, methyl methacrylate and styrene.

Preferably, however, polymer A is constructed of

| | |
|---|---|
| ≥70 and ≤100 wt % | of at least one monomer A1, and |
| ≥0 and ≤30 wt % | of at least one monomer A2, | and more preferably of

| | |
|---|---|
| ≥85 and ≤100 wt % | of acrylic acid, methacrylic acid, maleic acid, maleic anhydride and/or itaconic acid, and |
| ≥0 and ≤15 wt % | of methyl acrylate, ethyl acrylate, n-butyl acrylate, 2-ethylhexyl acrylate, methyl methacrylate and/or styrene, | in polymerized form.

It is particularly advantageous, however, for polymer A to be constructed exclusively of monomers A1, more particularly of acrylic acid or acrylic acid and maleic acid or anhydride in polymerized form.

Preparing polymers A is familiar to a person skilled in the art and is effected for example by free-radical polymerization of monomers A1 and A2 according to the method of bulk, emulsion, solution, precipitation or suspension polymerization (see also the preparation of corresponding polymers in WO 99/09100 page 5 line 12 to page 13 line 7). Polymers A are preferably obtained by free-radically initiated aqueous emulsion polymerization or by solution polymerization. Free-radically initiated aqueous emulsion polymerization is used to obtain polymers A particularly when the monomer mixture used for polymerization comprises monomers A2 in such amounts that a separate phase of monomer forms in the aqueous polymerization medium.

The conduct of free-radically initiated emulsion polymerizations of ethylenically unsaturated monomers in an aqueous medium has been extensively described before and therefore is well known to a person skilled in the art [cf. emulsion polymerization in Encyclopedia of Polymer Science and Engineering, Vol. 8, pages 659 ff. (1987); D.C. Blackley, in High Polymer Latices, Vol. 1, pages 35 ff. (1966); H. Warson, The Applications of Synthetic Resin Emulsions, Chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer, F. Hölscher, Springer-Verlag, Berlin (1969)]. The free-radically initiated aqueous emulsion polymerization reactions are typically carried out by the ethylenically unsaturated monomers being dispersed, by means of dispersants, in the aqueous medium in the form of monomer droplets and polymerized by means of a free-radical polymerization initiator, and aqueous polymer dispersions are formed.

The aqueous polymer dispersions used according to the present invention typically have polymer A solids contents of ≥10% and ≤70% by weight, frequently ≥20% and ≤65% by weight and often ≥40% and ≤60% by weight, all based on the aqueous polymer dispersion. The number average particle diameter determined via quasi-elastic light scattering (ISO standard 13321) in the case of polymers A obtained in an emulsion polymerization (cumulant z-average) is generally between 10 and 2000 nm, advantageously between 20 and 1000 nm and more advantageously between 50 and 700 nm or 80 to 400 nm.

The method of free-radically initiated solution polymerization is also familiar to a person skilled in the art and is carried out more particularly in water or in an organic solvent [see for example A. Echte, Handbuch der Technischen Polymerchemie, Chapter 6, VCH, Weinheim, 1993 or B. Vollmert, Grundriss der Makromolekularen Chemie, Volume 1, E. Vollmert Verlag, Karlsruhe, 1988; L. Kotzeva, J. Polym. Sci. A-27, 1989 (4), pages 1325ff; C. Erbil et al., Polymer 41, 2000, pages 1391ff; C. Yang, X. Lu Yun, J. Polym. Sci. 75(2), 2000, pages 327ff; M. Sen et al., Polymer 40(9), 1999, pages 913ff; F. Wang et al., Anal. Chem. 68, 1996, pages 2477ff; J. Velada et al., Macromol. Chem. and Phys. 196, 1995, pages 3171ff; J. M. Cowie, C. Haq, Br. Polym. J. 9, 1977, pages 241ff; J. Velada et al., Polymer Degradation and Stability 52, 1996, pages 273ff; A. Horta et al., Makromol. Chem., Rapid Commun. 8, 1987, pages 523ff; T. Hirano et al., J. Polym. Sci. A-38, 2000, pages 2487ff; B. E. Tate, Adv. Polymer Sci. 5, 1967, pages 214ff). When polymer A is prepared in an organic solvent, the conclusion of the polymerization is generally followed by removal of the organic solvent to an at least partial extent, advantageously to an extent ≥50% by weight or ≥90% by weight and particularly advantageously completely and the polymer A is taken up in water, advantageously in deionized water. The corresponding methods are familiar to a person skilled in the art. For instance, exchanging the solvent for water may be done by the solvent being distilled off at least partially, advantageously completely in one or more stages, for example at atmospheric pressure (1 atm absolute) or at reduced pressure (<1 atm absolute), and replaced by water. Frequently, it can be beneficial for the solvent to be removed from the solution by passing steam thereinto, and in the process to be replaced by water at the same time. This is more particularly the case when the organic solvent has a certain volatility in steam. The resulting aqueous polymer solutions, which are used in the aqueous binder of the present invention, typically have polymer A solids contents of ≥10 and ≤70 wt %, frequently ≥20 and ≤65 wt % and often ≥40 and ≤60 wt %, all based on the aqueous polymer solution.

It is advantageous to use polymer A as a solution or dispersion in an aqueous medium (aqueous polymer A solution or aqueous polymer A dispersion).

When polymer A is obtained by free-radically initiated aqueous emulsion polymerization, its glass transition temperature $T_g$ is frequently in the range ≥0 and ≤170° C., advantageously ≥10 and ≤100° C. and more advantageously ≥20 and ≤80° C. The glass transition temperature $T_g$ is the limiting value of the glass transition temperature to which said temperature tends with increasing molecular weight, according to G. Kanig (Kolloid-Zeitschrift & Zeitschrift für Polymere, Vol. 190, p. 1 equation 1). The glass transition temperature $T_g$ herein refers to the glass transition temperature determined by differential scanning calorimetry (DSC, at 20 K/min, midpoint measurement, DIN 53765). However, when polymers A are copolymers constructed of ≥60 and ≤100 wt % of monomers A1 in polymerized form, the glass transition temperature is frequently impossible to determine by the DSC method, since these polymers A decompose before reaching their glass transition temperature. In these cases, the glass transition temperature can be determined by the Fox equation.

The Fox equation also enables a person skilled in the art to identify polymers A in a suitable $T_g$ range and to synthesize them in a specific manner through suitable variation of monomers A and B in terms of type and quantity.

According to Fox (T. G. Fox, Bull. Am. Phys. Soc. 1956 [Ser. II] 1, page 123 and as per Ullmann's Encyclopädie der technischen Chemie, Vol. 19, page 18, 4th edition, Verlag Chemie, Weinheim, 1980), the glass transition temperature of at most lightly crosslinked copolymers is given to good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures, in degrees Kelvin, of the respective polymers composed only of one of the monomers 1, 2, ... n. The $T_g$ values for the homopolymers of most monomers are known and they are given for example in Ullmann's Encyclopedia of Industrial Chemistry, Vol. 5, Vol. A21, page 169, VCH Weinheim, 1992; further sources of homopolymer glass transition temperatures include, for example, J. Brandrup, E. H. Immergut, Polymer Handbook, 1st Ed., J. Wiley, New York 1966, 2nd Ed. J.Wiley, New York 1975, and 3rd Ed. J. Wiley, New York 1989.

When polymer A is ≥85 wt % and ≤100 wt % and more particularly 100 wt % constructed of monomers A1, this polymer A will have according to the present invention a weight average molecular weight in the range ≥1000 and ≤1 000 000 g/mol, advantageously ≥10 000 and ≤200 000 g/mol and more advantageously ≥50 000 and ≤100 000 g/mol. Determining the weight average molecular weight is familiar to a person skilled in the art and is effected more particularly by gel permeation chromatography using standard polymers of defined molecular weight.

As will be appreciated, it is also possible for the aqueous dispersions or solutions of polymer A to be dried, for example by the spray- or freeze-drying processes familiar to a person skilled in the art, to convert them into the corresponding polymer A powder and for the aqueous binder of the present invention to be obtained therefrom.

According to the present invention, in addition to polymer A, the aqueous binder further comprises as active constituent a nitrogen-free polyol compound having at least 2 hydroxyl groups (polyol B). It is advantageous here to use such polyols B as are only minimally volatile, if at all, and hence have a correspondingly low vapor pressure, at the drying and/or curing temperatures.

Polyol B may in principle be a compound having a molecular weight ≤1000 g/mol or a polymeric compound having a molecular weight >1000 g/mol. As polymeric compounds having at least 2 hydroxyl groups there may be mentioned by way of example polyvinyl alcohol, partially hydrolyzed polyvinyl acetate, homo- or copolymers of hydroxyalkyl acrylates or hydroxyalkyl methacrylates, for example hydroxyethyl acrylate, hydroxyethyl methacrylate, hydroxypropyl acrylate or hydroxypropyl methacrylate. Examples of further polymeric polyols B useful according to the present invention are found inter alia in WO 97/45461 page 3 line 3 to page 14 line 33. When polyvinyl alcohol is used as polyol B, its weight average molecular weight is advantageously ≥5000 and ≤100 000 g/mol and more advantageously ≥10 000 and ≤50 000 g/mol.

As polyol B having a molecular weight ≤1000 g/mol there come into consideration all those organic compounds which have at least 2 hydroxyl groups and a molecular weight ≤1000 g/mol. Examples are ethylene glycol, 1,2-propylene glycol, glycerol, 1,2-butanediol, 1,4-butanediol, pentaerythritol, trimethylolpropane, sorbitol, sucrose, glucose, 1,2-dihydroxybenzene, 1,3-dihydroxybenzene, 1,4-dihydroxybenzene, 1,2,3-trihydroxybenzene, 1,2-dihydroxycyclohexane, 1,3-dihydroxycyclohexane and 1,4-dihydroxycyclohexane.

According to the present invention, polyols B having a molecular weight ≤1000 g/mol are preferably used whenever in addition to the improved mechanical strength there is an additional desire for a low tendency to yellow on the part of the shaped articles obtainable according to the present invention.

According to the present invention, it is therefore preferable to use at least one polyol B selected from the group comprising glycerol, trimethylolpropane and polyvinyl alcohol, of which glycerol and/or trimethylolpropane is/are particularly preferred.

The binders of the present invention preferably utilize polymer A and polyol B in such a mixing ratio relative to each other that the weight ratio of polymer A to polyol B (based on solids) is in the range from 100:1 to 1:2, advantageously in the range from 50:1 to 1.5:1 and more advantageously in the range from 10:1 to 2:1.

It is particularly advantageous for the amounts of polymer A and polyol B to be chosen such that the ratio of the number of carboxyl equivalents in polymer A to the number of hydroxyl equivalents in polyol B is in the range from 20:1 to 1:1, preferably in the range from 15:1 to 1.5:1 and more preferably in the range from 12:1 to 2:1 (an anhydride group here being reckoned as two carboxyl groups).

According to the present invention, the aqueous binder, in addition to polymer A and polyol B, further comprises as an essential constituent at least one hydroxyl-free organic nitrogen compound having at least one $pK_B$ value ≤7 (measured at 25° C. in deionized water) and/or at least one hydroxyl-free imidazole compound [nitrogen base C].

The $pK_B$ value is a familiar constant to a person skilled in the art for characterizing bases which indicates the desire of a base to take up protons. The rule is that the smaller the $pK_B$ value, the greater the desire of a base to take up protons. The determination of $pK_B$ values is familiar to a person skilled in the art and is more particularly done by titration in aqueous solution (see for example G. Jander, K. F. Jahr, G. Schulze, Maßanalyse, 16th edition, page 81, Walter de Gruyter, 2002). The $pK_B$ values of the commonly used bases are known and are listed for example in the relevant electronic reference works, such as www.Kass-net.de (and the reference works cited therein). If only the corresponding acid strength value $pK_A$ is available for a compound (as for example in P. Sykes, A Guidebook to Mechanism in Organic Chemistry, Fourth Impression 1963, pages 49 ff), the $pK_B$ value is easily determined therefrom by the following equation:

$$pK_B = 14 - pK_A$$

It is also possible, as will be appreciated, that a hydroxyl-free organic nitrogen compound has more than one $pK_B$ value. When this is the case, however, the hydroxyl-free organic nitrogen compound which is usable according to the present invention shall have at least one $pK_B$ value ≤7.

Examples of hydroxyl-free organic nitrogen compounds having at least one $pK_B$ value ≤7 are mono-, di- or trialkylamines, more particularly n-propylamine, n-butylamine, n-hexylamine, diethylamine, di-n-propylamine, di-n-butylamine, triethylamine and/or tri-n-propylamine.

In addition to the hydroxyl-free organic nitrogen compounds having at least one $pK_B$ value ≤7, hydroxyl-free imidazole compounds can also be used as nitrogen base C. Hydroxyl-free imidazole compounds include for example imidazole itself and also its derivatives with $C_1$-$C_5$-alkyl groups, for example a methyl, ethyl, n-propyl, isopropyl, n-butyl, tert-butyl, isobutyl, n-pentyl, tert-pentyl or isopentyl group, as a substituent in position 1, 2, 4 and/or 5, but preferably in position 1. Imidazole and/or 1-methylimidazole are preferred imidazole compounds.

The nitrogen bases C which can be used according to the present invention advantageously have a solubility ≥0.5 g, preferably ≥2 g and more preferably ≥5 g in 100 g of deionized water at 20° C. and 1 atm (=1.013 bar absolute).

It is further advantageous when the nitrogen bases C used for producing the aqueous binder of the present invention have a boiling point ≥40° C., preferably ≥55° C. and more preferably ≥70° C. at 1 atm.

The at least one nitrogen base C used for producing the aqueous binder of the present invention is advantageously selected from the group comprising n-propylamine, n-butylamine, n-hexylamine, diethylamine, di-n-propylamine, di-n-butylamine, triethylamine, tri-n-propylamine, imidazole and 1-methylimidazole, of which n-propylamine, n-butylamine, n-hexylamine, diethylamine, di-n-propylamine, di-n-butylamine, triethylamine and tri-n-propylamine are particularly preferred.

The amount of nitrogen base C in the aqueous binder of the present invention is ≥0.1 and ≤20 parts by weight, advantageously ≥2 and ≤17 parts by weight and more advantageously ≥5 and ≤15 parts by weight, all based on 100 parts by weight of polymer A.

It is essential that the aqueous binder of the present invention may in addition to the aforementioned polymer A, polyol B and nitrogen base C components optionally further comprise an accelerator comprising a phosphorus group. Accelerators comprising a phosphorus group are more particularly polyphosphoric acid, hypophosphoric acid, phosphoric acid, alkylphosphinic acid or oligomers/polymers of these acids, and also salts thereof. Accelerators comprising a phosphorus group are known to a person skilled in the art and are disclosed for example in EP-A 583086, page 6 lines 18 to 29, EP-A 651088, page 5 lines 30 to 42 or US-A 2004/82689, section [0031]. The disclosures of both references are hereby expressly incorporated herein by reference.

The amount in the aqueous binder according to the present invention of accelerator comprising a phosphorus group may be up to 40 parts by weight and often ≥2.5 and ≤10 parts by weight, all based on 100 parts by weight of the summed total amounts of polymer A and polyol B. What is essential, however, is that, in one embodiment, the amount in the binder according to the present invention of an accelerator comprising a phosphorus group is advantageously <1 part by weight, preferably ≤0.5 parts by weight and more preferably ≤0.1 parts by weight, all based on 100 parts by weight of the summed total amounts of polymer A and polyol B. It is particularly advantageous for the binder of the present invention not to contain any phosphorus component at all in this embodiment.

Furthermore, the aqueous binder of the present invention may also comprise further, optional auxiliary substances familiar to a person skilled in the art, examples being thickeners, defoamers, neutralizers, buffers, preservatives, finely divided inert fillers, such as alumino-silicates, quartz, precipitated or pyrogenous silica, light or heavy spar, talc or dolomite, color-conferring pigments, such as titanium white, zinc white or iron oxide black, adhesion promoters and/or flame retardants.

When the aqueous binder of the present invention is to be used as binder for mineral fibers and/or glass fibers or to be more precise fibrous nonwoven webs produced therefrom, the aqueous binder is advantageously admixed with ≥0.001 and ≤5 wt % and more advantageously ≥0.05 and ≤2 wt %, based on the summed total amounts of polymer A, polyol B and nitrogen base C, of at least one silicon-containing organic compound (adhesion promoter), for example an alkoxysilane, such as methyltrimethoxysilane, n-propyltrimethoxysilane, n-octyltrimethoxysilane, n-decyltriethoxysilane, n-hexadecyltrimethoxysilane, dimethyldimethoxysilane, trimethylmethoxysilane, 3-acetoxypropyltrimethoxysilane, 3-aminopropyltrimethoxysilane, 3-aminopropyltriethoxysilane, 3-chloropropyltrimethoxysilane, (3-glycidyloxypropyl)trimethoxysilane, 3-mercaptopropyltrimethoxysilane and/or phenyltrimethoxysilane, in which case functionalized alkoxysilanes, such as 3-acetoxypropyltrimethoxysilane, 3-aminopropyltrimethoxysilane, 3-aminopropyltriethoxysilane, 3-chloropropyltrimethoxysilane, (3-glycidyloxypropyl)trimethoxy-silane and/or 3-mercaptopropyltrimethoxysilane, are particularly preferred.

As will be appreciated, the aqueous binder of the present invention may still comprise <5 wt % of water-soluble organic solvents [solubility >10 g per 100 g of deionized water at 20° C. and 1 atm (absolute)], for example acetone, methanol, ethanol and/or isopropanol. Advantageously, however, the organic solvent content of the aqueous binder is ≤1 wt % and more preferably ≤0.5 wt %.

The aqueous binder of the present invention typically has solids contents (formed from the summed total amount of polymer A, polyol B and nitrogen base C, when reckoned as solids) of ≥1 and ≤80 wt %, advantageously ≥20 and ≤70 wt % and more advantageously ≥40 and ≤60 wt %, all based on the aqueous binder. Frequently, these binders are diluted with deionized water to a solids content ≥1 and ≤20 wt % for technical reasons prior to their use on the granular and/or fibrous substrates and more particularly for bonding fiber webs.

The aqueous binder of the present invention typically has a pH value (measured at 23° C.; diluted with deionized water to a solids content of 5 wt %) in the range of ≥1 and ≤10, advantageously ≥1.5 and ≤6 and more advantageously ≥2 and ≤5. Any acidic or basic compounds familiar to a person skilled in the art can be used for setting the pH. More particularly, however, the acidic or basic compounds used are not volatile at the temperatures during drying and/or curing, examples being sulfuric acid or phosphoric acid on the one hand and sodium hydroxide or potassium hydroxide on the other.

The aqueous binder of the present invention is very useful as binder for fibrous and/or granular substrates. The aqueous binder of the present invention can therefore be used with advantage for production of shaped articles from fibrous and/or granular substrates.

Granular and/or fibrous substrates are familiar to a person skilled in the art. Examples include wood chips, wood fibers, cellulose fibers, textile fibers, polymeric fibers, glass fibers, mineral fibers or natural fibers such as jute, flax, hemp or sisal, but also cork chips, sand as well as other organic or inorganic natural and/or synthetic granular and/or fibrous compounds whose longest dimension is ≤10 mm, preferably ≤5 mm and more particularly ≤2 mm in the case of granular substrates. It will be appreciated that the term substrate shall also comprehend the fiber webs obtainable from fibers, for example the mechanically consolidated (needled, for example) or chemically, for example with melamine-formaldehyde resins, prebonded fiber webs. The aqueous binder of the present invention is especially advantageously useful as a formaldehyde-free binder system for the aforementioned fibers and/or fiber webs formed therefrom, and the fiber webs are particularly preferred.

The process for producing a shaped article from a granular and/or fibrous substrate and the aforementioned aqueous binder advantageously comprises applying the aqueous binder of the present invention uniformly to the granular and/or fibrous substrate (impregnating it), optionally shaping the granular and/or fibrous substrate treated with the aqueous binder and then subjecting the treated granular and/or fibrous substrate to a thermal treatment step at a temperature ≥100° C.

The treatment (impregnation) of the granular and/or fibrous substrate with the aqueous binder of the present invention is generally performed by the aqueous binder of the present invention being uniformly applied to the surface of the granular and/or fibrous substrate. The amount of aqueous binder for this is chosen such that ≥0.1 g and ≤100 g, preferably ≥1 g and ≤50 g and more preferably ≥5 g and ≤30 g of aqueous binder (reckoned as summed total amounts of polymer A, polyol B and nitrogen base C, on solids) are used per 100 g of granular and/or fibrous substrate. The actual method of impregnating the granular and/or fibrous substrate is familiar to a person skilled in the art and takes the form for example of drenching or spraying the granular and/or fibrous substrate.

In one possible embodiment of the present invention, the binder is obtained in a separate step prior to application to the granular and/or fibrous substrate, viz., by mixing polymer A, polyol B and nitrogen base C in any desired manner. It will be appreciated that the binder is also obtainable by mixing polymer A with a mixture of polyol B and nitrogen base C in an aqueous medium. Polymer A is advantageously used in the form of an aqueous polymer dispersion or in the form of an aqueous polymer solution. When the site for applying the binder to the granular and/or fibrous substrate is located in a mixing drum or in a mixing sector for example, polymer A, polyol B and nitrogen base C, particularly in the form of aqueous solutions, can be metered into the mixing drum or into the mixing sector at different locations, for example in the course of the aqueous wood destructurization into the blowline between the refiner and the dryer. In this case, components A, B and C only become mixed together on the granular and/or fibrous substrate. But it is also possible for polymer A, more particularly in the form of its aqueous dispersion or solution, to be mixed with polyol B and to add this mixture to the mixing drum or mixing sector. But it is self-evidently also possible for polymer A, more particularly in the form of its aqueous dispersion or solution, polyol B and nitrogen base C to be mixed in a mixing chamber, mixing nozzle or some other static or dynamic mixing device only just immediately before application to the granular and/or fibrous substrate.

After impregnation, the granular and/or fibrous substrate is optionally formed into the desired shape, for example by introduction into a heatable press or mold. Subsequently, the shaped impregnated granular and/or fibrous substrate is dried and cured in a manner familiar to a person skilled in the art.

Drying and curing the optionally shaped impregnated granular and/or fibrous substrate is frequently effected in two temperature stages, of which the drying stage takes place at a temperature <100° C., preferably ≥20° C. and ≤95° C. and more preferably ≥40 and ≤90° C. and the curing stage takes place at a temperature ≥100° C., preferably ≥130 and ≤250° C. or ≥160 and ≤220° C. and more preferably ≥170° C. and ≤210° C.

The drying stage advantageously takes the form of drying at a temperature <100° C. until the shaped impregnated granular and/or fibrous substrate, which frequently has yet to acquire its ultimate shape (and hence is referred to as a blank or intermediate article), has a residual moisture content ≤30 wt % preferably ≤15 wt % and more preferably ≤10 wt %. This residual moisture content is generally determined by about 1 g of the resulting blank being weighed at room temperature, then dried at 110° C. for 2 minutes and then cooled and reweighed at room temperature. The residual moisture content is equal to the weight difference of the blank before and after drying at 100° C., based on the weight of the blank before drying, multiplied by a factor of 100.

The blank obtained in this way is still formable after heating to a temperature of 95° C. and can be formed at this temperature into the ultimate shape desired for the shaped article.

The subsequent curing stage advantageously takes the form of the blank being heated at a temperature ≥100° C. until it has a residual moisture content ≤2 wt %, preferably ≤1 wt % or ≤0.5 wt % and more preferably ≤0.1 wt %, in the course of which the binder cures as a result of a chemical reaction of esterification.

The shaped articles are frequently produced by the blank being formed, in a molding press in the aforementioned temperature ranges, into the ultimate shape and being cured thereafter.

But it is also possible, as will be appreciated, for the drying stage and the curing stage of the shaped articles to take place in one operation, for example in a molding press.

The shaped articles obtainable by the process of the present invention and more particularly the fiber webs obtainable by the process of the present invention have advantageous properties, especially an improved wet breaking strength and/or lower yellowing compared with the shaped articles of the prior art.

The examples which follow are nonlimiting and illustrate the invention.

EXAMPLES

The materials used in the inventive and comparative examples which follow are as follows:

Polymer A

An acrylic acid-maleic acid copolymer consisting of 75 wt % of acrylic acid units and 25 wt % of maleic acid units and having a weight average molecular weight of 87 000 g/mol in the form of a 47 wt % aqueous solution.

Polyols B

Glycerol (>99 wt %, from Riedel-de Haen)

Trimethylolpropane (>98 wt %, purum dist., from Sigma Aldrich)

Nitrogen Bases C

Triethylamine (99 wt %, from Sigma Aldrich)

n-Dipropylamine (99 wt %, from ACROS ORGANICS)

n-Hexylamine (99 wt %, from ACROS ORGANICS)

Imidazole (>99 wt %, from BASF SE)

1-Methylimidazole (99 wt %, from ACROS ORGANICS)

To produce the aqueous binder liquors, in each case 1000 g of the aforementioned 47 wt % aqueous solution of the acrylic acid-maleic acid copolymer were initially charged to a 5 l glass beaker at 20 to 25° C. (room temperature), and 141 g of polyol B were added in each case with stirring. These solutions were each admixed with 3.5 g of 3-aminopropyltriethoxysilane (Silquest® A-1100 silanes from Momentive Performance Materials) and also with the nitrogen bases C each indicated in table 1, in the respectively indicated amounts, by stirring for 10 minutes until homogeneous. The respective solutions were then diluted to a solids content of 5 wt % by addition of deionized water. The solutions obtained are referred to as binder liquors A1 to A7. No nitrogen bases C were admixed to the comparative liquors V1 and V2. The comparative liquor V3 was merely admixed with triethanolamine (>99 wt %, from BASF SE) instead of a polyol B and a nitrogen base C.

TABLE 1

Type of polyol B and type and amounts of nitrogen bases C in production of binder liquors A1 to A7 and comparative liquors V1 to V3

| Binder liquor | Polyol B | Nitrogen base C | Amount of nitrogen base [in g] |
|---|---|---|---|
| V1 | glycerol | — | — |
| A1 | glycerol | triethylamine | 30.6 |
| A2 | glycerol | triethylamine | 61.2 |
| A3 | glycerol | di-n-propylamine | 30.6 |
| A4 | glycerol | n-hexylamine | 30.6 |
| A5 | glycerol | imidazole | 30.6 |
| A6 | glycerol | 1-methylimidazole | 30.6 |
| V2 | trimethylolpropane | — | — |
| A7 | trimethylolpropane | triethylamine | 30.6 |
| V3 | triethanolamine | | 141 |

The shaped articles were produced using glass fiber webs (27×28.5 cm) from Whatman GF/A No. 1820-915 having a basis weight of 54 g/m².

To apply the binder liquors (impregnation), the glass fiber webs were passed in the longitudinal direction, on an endless PES foraminous belt, at a belt speed of 60 cm per minute, through the aforementioned 5 wt % aqueous binder liquors A1 to A7 and also V1 to V3. The aqueous binder liquors were subsequently sucked off to adjust the wet add-on to 216 g/m² (corresponding to 10.8 g/m² of binder reckoned as a solid). The impregnated glass fiber webs thus obtained were dried/cured in a Mathis oven on a plastics mesh as support at 180° C. in a maximum hot air stream for 3 minutes. After cooling to room temperature, test strips measuring 240×50 mm were cut in the fiber longitudinal direction. The test strips obtained were subsequently conditioned for 24 hours at 23° C. and 50% relative humidity. The glass fiber web test strips obtained are hereinbelow referred to as test strips A1 to A7 and also V1 to V3, in correspondence with the employed binder liquors A1 to A7 and also V1 to V3.

Determination of Wet Breaking Strength

To determine their wet breaking strength, the test strips A1 to A7 and V1 to V3 were kept in de-ionized water at 80° C. for 15 minutes and thereafter excess water was swabbed off with a woven cotton fabric. Breaking strength was determined on a Zwick-Roell Z005 type tensile tester. Test strips A1 to A7 and also V1 to V3 were clamped vertically into a tensioning device such that the free clamped length was 200 mm. Thereafter, the clamped test strips were pulled apart in the opposite direction at a speed of 25 mm per minute until the test strips broke. The higher the force needed to break the test strips, the better the corresponding breaking strength. Five measurements were carried out in each case. The values reported in table 2 each represent the average value of these measurements.

Determination of Yellowing

Yellowing was determined using a Lange colorimeter in a method based on DIN 5033 and DIN 6174. The test strips were tested against a white test tile as reference. The b* value was determined as a measure of yellowing (the CIELab System describes color exactly in a color space formed from three coordinate axes: L: lightness, a*: red-green axis, b*: yellow-blue axis, negative b* values are blue, positive b* values represent yellow hues). The measurements were carried out by placing in each case 6 test strips A1 to A7 and also V1 to V3 on top of each other and measuring the yellow coloration at three different places. The b* values reported in table 2 each represent the mean values of these measurements. The greater the yellow coloration, the greater the correspondingly reported b* value.

TABLE 2

Summary of breaking strength results and of yellowing results

| Test strip | Wet breaking strength [N/50 mm] | Yellowing [b* value] |
|---|---|---|
| V1 | 36 | 0.9 |
| A1 | 49 | 1.2 |
| A2 | 58 | 1.3 |
| A3 | 57 | 1.3 |
| A4 | 62 | 1.2 |
| A5 | 69 | 0.9 |
| A6 | 66 | 0.8 |
| V2 | 47 | 1.2 |
| A7 | 62 | 1.4 |
| V3 | 58 | 1.5 |

It is clearly apparent from the results that binder liquors A1 to A7, prepared by adding a nitrogen base C, are advantageous for the wet breaking strength of the fiber webs produced with these binder liquors. It is also apparent that the fiber webs produced using a binder composition according to the present invention have an approximately equivalent or improved wet breaking strength and lower yellowing compared with a binder composition obtained with triethanolamine.

We claim:

1. An aqueous binder, consisting essentially of, as active constituents:
   a) polymer A, comprising a polymer obtained by free-radical polymerization,
   wherein the polymer comprises, in polymerized form:

| ≥5 and ≤100 wt % | of monomer A1, α,β-monoethylenically unsaturated mono- or dicarboxylic acid and/or anhydride, and |
|---|---|
| ≥0 and ≤95 wt % | of of monomer A2, comprising ethylenically unsaturated compound which is copolymerizable with the monomers A1, | wherein a total amount of the monomers A1 and A2 is 100 wt %,
   b) polyol B, comprising a nitrogen-free polyol compound having at least two hydroxyl groups, and
   c) nitrogen base C, comprising a hydroxyl-free organic nitrogen compound having at least one pK$_B$ value ≤7, which is measured at 25° C. in deionized water and/or a hydroxyl-free imidazole compound;
   wherein the amount of nitrogen base C in the aqueous binder is ≥5 and ≤20 parts by
   weight, based on 100 parts by weight of polymer A and an equivalent ratio of carboxyl groups on the polymer A to hydroxyl groups on the polyol B is from 20:1 to 1:1.

2. The aqueous binder according to claim 1,
   wherein the polymer A is dissolved or dispersed in an aqueous medium.

3. The aqueous binder according to claim 1,
   wherein the polymer A comprises, in polymerized form:

| ≥70 and ≤100 wt % | of the monomer A1, and |
|---|---|
| ≥0 and ≤30 wt % | of the monomer A2. |

4. The aqueous binder according to claim 1,
wherein the polymer A comprises, in polymerized form:

| | |
|---|---|
| ≥85 and ≤100 wt % | of acrylic acid, methacrylic acid, maleic acid, maleic anhydride and/or itaconic acid, and |
| ≥0 and ≤15 wt % | of methyl acrylate, ethyl acrylate, n-butyl acrylate, 2 ethylhexyl acrylate, methyl methacrylate and/or styrene. |

5. The aqueous binder according to claim 1,
wherein the polyol B is at least one selected from the group consisting of glycerol, trimethylolpropane, and polyvinyl alcohol.

6. The aqueous binder according to claim 1,
wherein the nitrogen base C at 20° C. has a solubility ≥0.5 g in 100 g of deionized water.

7. The aqueous binder according to claim 1,
wherein the nitrogen base C has a boiling point ≥40° C. at 1 atm (absolute).

8. The aqueous binder according to claim 1,
wherein the nitrogen base C is at least one selected from the group consisting of n-propylamine, n-butylamine, n-hexylamine, diethylamine, di-n-propylamine, di-n-butylamine, triethylamine, tri-n-propylamine, imidazole, and 1- methylimidazole.

9. The aqueous binder according to claim 1,
wherein the weight ratio of polymer A to polyol B (based on solids) is 50:1 to 1.5:1.

10. The aqueous binder according to claim 1,
wherein an amount of a phosphorus component is <1 wt %, based on summed amounts of the polymer A and the polyol B.

11. An aqueous binder, consisting of, as active constituents:
a) polymer A, comprising a polymer obtained by free-radical polymerization,
wherein the polymer comprises, in polymerized form:

| | |
|---|---|
| ≥5 and ≤100 wt % | of monomer A1, comprising an α,β-monoethylenically unsaturated mono- or dicarboxylic acid, and |
| ≤0 and ≤95 wt % | of monomer A2, comprising an ethylenically unsaturated compound which is copolymerizable with the monomer A1, | wherein a total amount of the monomers A1 and A2 is 100 wt % and neither monomer A1 nor monomer A2 is an ethylenically unsaturated anhydride,
b) polyol B, comprising a nitrogen-free polyol compound having at least two hydroxyl groups, and
c) nitrogen base C, comprising a hydroxyl-free organic nitrogen compound having at least one $pK_B$ value ≤7, which is measured at 25° C. in deionized water and/or a hydroxyl-free imidazole compound, and
d) <1 wt % of a phosphorus component, based on summed amounts of the polymer A and the polyol B;
wherein the amount of nitrogen base C in the aqueous binder is ≥5 and ≤20 parts by weight, based on 100 parts by weight of polymer A, and an equivalent ratio of carboxyl groups on the polymer A to hydroxyl groups on the polyol B is from 20:1 to 1:1.

12. The aqueous binder according to claim 11,
wherein the polymer A is dissolved or dispersed in an aqueous medium.

13. The aqueous binder according to claim 11,
wherein the polymer A comprises, in polymerized form:

| | |
|---|---|
| ≥70 and ≤100 wt % | of the monomer A1, and |
| ≥0 and ≤30 wt % | of the monomer A2. |

14. The aqueous binder according to claim 11,
wherein the polymer A comprises, in polymerized form:

| | |
|---|---|
| ≥85 and ≤100 wt % | of acrylic acid, methacrylic acid, maleic acid, and/or itaconic acid, and |
| ≥0 and ≤15 wt % | of methyl acrylate, ethyl acrylate, n-butyl acrylate, 2 ethylhexyl acrylate, methyl methacrylate and/or styrene. |

15. The aqueous binder according to claim 11,
wherein the polyol B is at least one selected from the group consisting of glycerol, trimethylolpropane, and polyvinyl alcohol.

16. The aqueous binder according to claim 11,
wherein the nitrogen base C has a boiling point ≥40° C. at 1 atm (absolute).

17. The aqueous binder according to claim 11,
wherein the nitrogen base C is at least one selected from the group consisting of n-propylamine, n-butylamine, n-hexylamine, diethylamine, di-n-propylamine, di-n-butylamine, triethylamine, tri-n-propylamine, imidazole, and 1- methylimidazole.

18. The aqueous binder according to claim 11,
wherein the weight ratio of polymer A to polyol B (based on solids) is 50:1 to 1.5:1.

19. The aqueous binder according to claim 10,
wherein the binder contains no phosphorous component.

20. The aqueous binder according to claim 11,
wherein the binder contains no phosphorous component.

* * * * *